US005135419A

United States Patent [19]

Kahn

[11] Patent Number: 5,135,419

[45] Date of Patent: Aug. 4, 1992

[54] METHOD OF ENCASING A NON-LINEAR ATUBULAR MEMBER

[76] Inventor: Jon B. Kahn, 3002 Stargrass Ct., League City, Tex. 77573

[21] Appl. No.: 814,606

[22] Filed: Dec. 30, 1991

Related U.S. Application Data

[63] Continuation-in-part of Ser. No. 663,152, Mar. 1, 1991, Pat. No. 5,075,992.

[51] Int. Cl.[5] .......................... H01J 9/00; B05D 5/06; B29C 33/40

[52] U.S. Cl. .......................................... 445/26; 445/58; 264/1.7; 264/221; 427/67; 427/226

[58] Field of Search .......................... 427/67, 133, 226; 264/272.16, 1.7, 221, 317; 40/406; 445/58, 26, 22

[56] References Cited

U.S. PATENT DOCUMENTS 1,737,092 11/1929 Pearson et al. ........................ 40/406
2,029,183 1/1936 Mukasa .................................. 40/406

FOREIGN PATENT DOCUMENTS 58-212921 12/1983 Japan .................................. 264/221

*Primary Examiner*—Kurt Rowan
*Assistant Examiner*—Jeffrey T. Knapp
*Attorney, Agent, or Firm*—Marvin J. Marnock

[57] ABSTRACT

A method of encasing a luminous translucent tubing (12,32) of a non-linear complex geometrical configuration in a transparent outer member (14,34) and forming a passage (25,35) of annular radial cross section therebetween, which method comprises coating the exterior of the tubing (12,32) with a viscous temporary material (17,47) which solidifies to provide a coating with smooth exterior surface, coating the temporary substance (17,47) with a permanent forming material in a viscous liquid state which hardens to form a rigid transparent outer member (14,34) in coextensive surrounding relation to the tubing (12,32) and its coating of temporary material (17,47), applying heat to said coating of temporary material at a temperature above the melting point of the temporary material and below the softening temperature of the outer member, and removing the temporary material from between the translucent tubing (12,32) and the transparent outer member (14,34) while supporting the translucent tubing in fixed relation to the outer member to provide a passage (25,35) defined by the annular space between the translucent tubing and the transparent outer member.

16 Claims, 2 Drawing Sheets

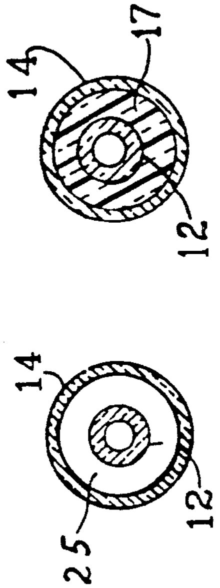
FIG 2b
FIG. 2a
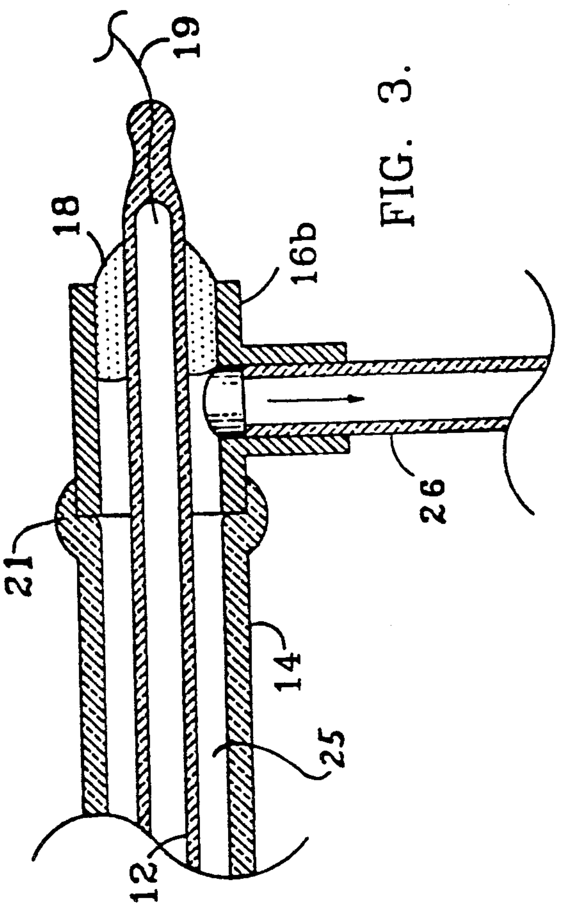
FIG. 3.
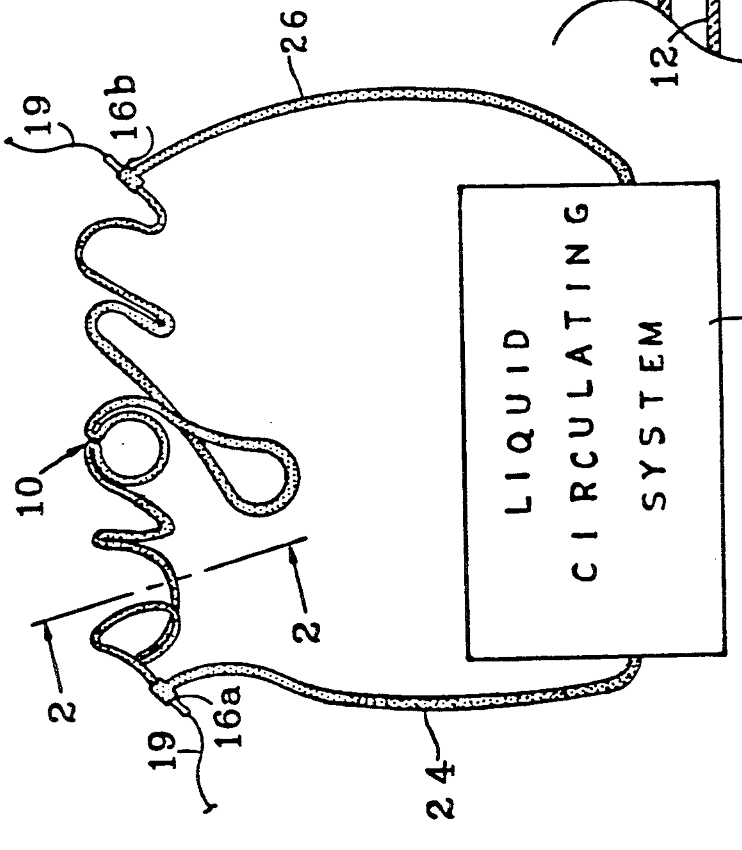
FIG. 1.

METHOD OF ENCASING A NON-LINEAR ATUBULAR MEMBER

This application is a continuation-in-part of co-pending Application Ser. No. 07/663,152 filed Mar. 1, 1991, now U.S. Pat. No. 5,075,992.

FIELD OF THE INVENTION

This invention relates to a method of encasing a tubular member in an outer member in concentric radially spaced sleeved relation thereto and more particularly to a method of encasing a tubular member of non-linear configuration and complex geometric shape in a transparent outer member and forming an annular passage therebetween.

BACKGROUND OF THE INVENTION

A need for encasing a tubular member of non-linear configuration in an outer member in spaced sleeved relationship thereto sometimes arises in the art of fabricating visual display systems such as a sign which comprises transparent tubular members in sleeved relationship and configured in script form. The sign is incorporated in a liquid circulating system wherein colored liquids are circulated through the passage formed between the sleeved tubular members of the sign. Such a display system, as disclosed in U.S. Pat. No. 2,029,183 and in applicant's co-pending application, Ser. No. 07/663,152, filed Mar. 1, 1991, now U.S. Pat. No. 5,075,992, typically comprises a luminous tubing in a configuration of complex geometric form, such as script, which tubing is concentrically disposed within an outer pipe of transparent material. A liquid circulating system connected to the ends of the outer pipe is arranged to circulate colored liquids in sequence through the passage formed between the sleeved tubular members. Since the outer member must be transparent, it must therefore retain a very high surface finish on both its interior and exterior surfaces of a quality comparable to that of transparent optical materials. In addition, the outer member must be chemically resistant and stain resistant to the liquids which are circulated through the display system.

Because of the complex geometry typically associated with a sign in the form of a luminous tubing in script configuration, the conventional construction methods and materials used in constructing a tube assembly wherein the tubes are of linear configuration and wherein one tube is disposed internally of another in concentric relation thereto, are not adequate. The materials employed in these prior art methods are almost always opaque and under the associated conditions of manufacture do not provide highly smooth surface finishes of a quality appropriate for most visual display systems. Furthermore, materials which might be used to provide for transparency are frequently ill-suited for other reasons such as inappropriate melting temperatures or the like.

SUMMARY OF THE INVENTION

The invention is a method of encasing a translucent tubular member of non-linear configuration and complex geometry in a transparent outer member in a manner so as to provide a passage of annular radial cross section therebetween. The method comprises the steps of forming the translucent tubing, which is adapted to be rendered luminous, into a predetermined configuration of non-linear complex geometric shape, coating the exterior of the translucent tubing with a viscous temporary substance which solidifies to provide a coating of pre-determined thickness and smooth exterior surface, coating the temporary substance with a material in a viscous liquid state which hardens to form a rigid permanent transparent outer member in coextensive surrounding relation to the translucent tubing and its coating of temporary substance, applying heat to said coating of temporary substance at a temperature above the melting point of the temporary substance and below the softening point of the outer member, and removing the molten temporary substance from between the translucent tubing and the transparent outer member while rigidly supporting the translucent tubing in fixed relation to the outer member to provide a passage defined by the annular space between the translucent tubing and the transparent outer member.

DESCRIPTION OF THE DRAWINGS

FIG. 1 is a plan view of a sign in script form and an associated liquid circulating system connecting thereto wherein the sign is constructed in accordance with the method of construction of the invention;

FIG. 2*a* is an enlarged radial cross section view through the sign of FIG. 1 as taken along the section line 2—2 in FIG. 1;

FIG. 2*b* is a view similar to FIG. 2*a* but showing the sign during a phase of its construction;

FIG. 3 is a enlarged fragmentary section view showing details of construction of the sign of FIG. 1;

DETAILED DESCRIPTION OF THE INVENTION

Figure 5:
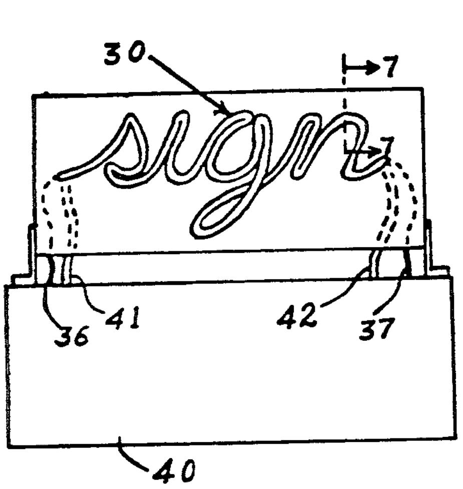
FIG. 5 is a plan view of another embodiment of a sign and an associated liquid circulating system wherein the sign is constructed in accordance with the method of the invention.

Referring more particularly to the drawings, there is shown in FIG. 1 a "sign" 10 in which the work "sign" is depicted in script form and connected to a fluid circulating system 11 operatively associated therewith. The sign consists of a white light electric gas discharge tube 12 of transparent glass which is encased in a hollow transparent concentric tubing 14 which allows the flow of colored liquids through the annulus defined by the space between the inner tubing 12 and the outer tubing 14 and thereby discriminately filters the white light, causing the sign to appear to be the color of the liquid which is present between the tubings. The fluid circulating system 11, not described in detail herein, is connected to the sign 10 by means of an entry conduit line 24 connected to the tubing 14 at one end of the sign and an exit conduit line 26 which connects to the tubing 14 at the other end of the sign. The fluid circulating system 11 can be of the type as shown in U.S. Pat. No. 2,029,183 or as shown in co-pending application, Ser. No. 07/663,152, filed Mar. 1, 1991, now U.S. Pat. No. 5,0755,992.

The construction of the sign 10 and the method of encasing the glass tubing 12 within the hollow, concentric outer tubing 14 is depicted in FIGS. 2A, 2B and 3. As a first step, the tubing 12 is coated externally with a temporary material, such as a water-gelatin composition of gelatin dissolved in water, or other temporary material 17, of a thickness corresponding to a thickness associated with the annulus which will form a flow passage between the tubes 12 and 14. The coating may be accomplished by repeated dippings of the glass tubing 12 in a vat of water-gelatin which has been heated to liquid or paste form so as to form the coating which, upon removal of the tubing from the vat, is allowed to cool and harden about the glass tubing after each dipping. The heated gelatin-compound or other material 17 is applied over substantially the entire length of the tubing 12 except for the end portions and the dippings into the vat are repeated a sufficient number of times to provide a coating of the desired thickness.

For cooling the heated gelatin after each dipping, refrigeration can be employed to substantially reduce the cooling period to 15 minutes or less, but caution should be exercised to avoid reducing the gelatin temperature to 32° F. or less, at which temperature crystallization occurs and rough gelatin surfaces are created.

As the water-gelatin composition cools and solidifies it also forms a coating with an external surface having a very smooth surface finish. A water-gelatin composition which is suitable for use as the temporary material 17 comprises a commercially available food gelatin which typically includes components of disodium phosphate, artificial coloring and fumaric and adipic acids.

For most signs in script form, the tubing 12 is likely to have a complex geometry and for such forms, the permanent outer tubing 14 is most appropriately a plastic material, such as a polyester resin which can be applied as a viscous transparent liquid coating over the gelatin and then hardens to rigid permanent form as it reacts with a suitable chemical hardener, such as methyl ethyl ketone, which is mixed therewith. For the chemical reaction to take place, the ambient temperature must be greater than 65° F., the minimum reaction temperature.

The application of the viscous polyester resin to the smooth surface of the hardened water-gelatin 17 may be accomplished by repeated dippings of the tubing 12 with its coating of the temporary gelatin material 17 into a vat filled with the viscous polyester resin and its chemical hardener. After each removal from the vat, the polyester resin is allowed time to harden and form a permanent coating of transparent material in sleeved relationship to the water-gelatin 17. In like manner to forming the coating of the temporary material 17, the number of dippings is continued until the coating of hardened polyester resin attains a desired thickness.

While satisfactory permanent outer tubings have been formed in this manner, it is to be understood that other techniques, such as spraying or painting the viscous polyester resin onto the tubing 12 might also be employed.

After the coating of polyester resin attains a desired thickness and forms the permanent outer tubing 14, it is necessary to remove the temporary material 17. This is accomplished by the application of relatively low heat, as in a microwave oven or the like, which turns the gelatin 17 into a liquid. This occurs at a temperature of approximately 90° F. which is below that at which the glass tubing 12 and the hard tubing 14 would begin to soften. During this step of the construction process, the tubing 12 is retained and supported in concentric relation with respect to the tubing 14 by means of three-port tubular connector tees 16*a*, 16*b* fitted at the respective ends of the tubing 14. One port of the cross bore of each connector tee is fitted to an end of the tubing 14 and the other port of the cross bore is filled with epoxy material 18 which is deposited about the tubing 12 at the outer end of each connector tee and supports the tubing 12 whereby the right angle extension at the head of each tee and the annulus between the tubings 12 and 14 are in fluid communication where the annulus is evacuated. Heated liquid material 17 is allowed to flow out through the tees 16*a*, 16*b* thereby leaving a conduit passage 25.

In the manufacturing process, the fitting of connector tees to the ends of the tubing 14 is preferably done during the process step of building the tubing 14, such that the polyester resin which forms the tubing 14 also serves as a bonding agent to the connector. For strengthening the connection, an annular bead 21 of polyester resin mixed with its chemical hardener is applied circumferentially by painting, or the like, about the joined ends of the connector and the tubing 14.

The glass tubing 12, which is made into the desired script configuration by conventional glass forming techniques, is preferably an electric gas discharge tube, being filled with argon gas and equipped with electrodes 19 at sealed ends thereof. The tubing 12 is preferably a white light argon sign, although the tubing may be filled with other rarefied gases which are rendered luminous by ionization and electric current when placed in an electric field.

Figure 4:
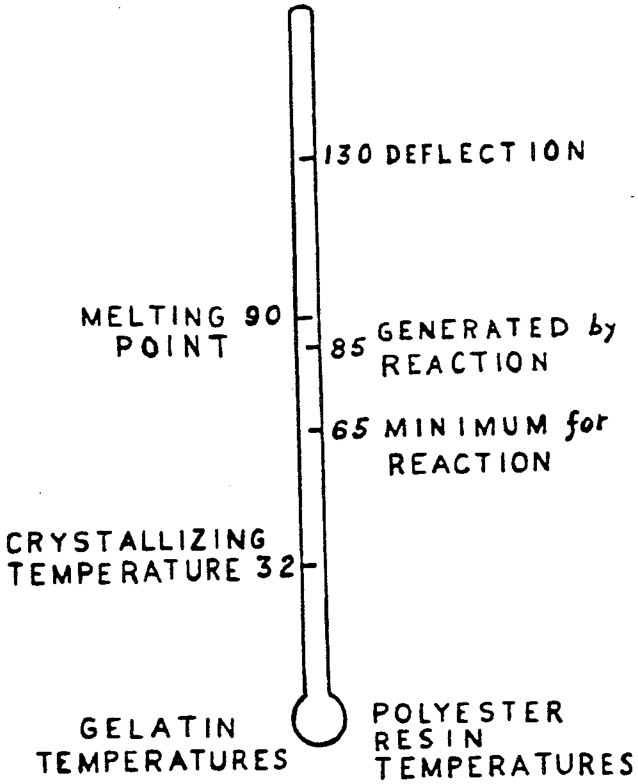
FIG. 4 is a graphical illustration of temperatures associated with various physical states of the materials used in practicing the method of the invention.

It is therefore to be noted, that in the step of removing the temporary material 17 from between the glass tubing 12 and the outer transparent material 14, the temperature must be raised to a level which is higher than the melting point of the temporary material but less than the deflection temperature of the outer member, which is the temperature at which the outer member begins to soften. With reference to the graph of FIG. 4, it will be seen that an acceptable range for the heating temperature is defined by the melting point of water-gelatin at 90° F. and the limiting deflection temperature of 130° F. at which the polyester resin of the outer member 14 begins to soften.

Other requirements for the temporary material 17 are that it will harden to a substantially rigid state after each application in forming the coating about the glass tubing 12 and that it must also provide a very high surface finish after hardening, to a degree comparable to that of transparent optical materials. The temporary material must also be easily removable from between the glass tubing 12 and the outer member 14 and without leaving a residue, since a subsequent removal of the residue by chemical or mechanical means could damage the interior surface finish of the outer member.

For the permanent material used in forming the outer transparent member 14, it is a requirement that it be castable at a temperature which is below that of the melting point of the temporary material 17, but above the crystalling temperature of the temporary material in order to retain its high surface finish. Another important characteristic is that after casting, it will harden to a state in which its deflection temperature, the temperature at which it begins to soften, is above the melting point of the temporary material 17. The latter required characteristic for the material of the outer transparent member 14 is attained by the use of polyester resin which achieves its hardening through chemical reaction with its hardener, the methyl ethyl ketone mixed therein, not because of the physical processes of heating and cooling. Since heat is generated by the chemical reaction, a further requirement is that the temperature of the polyester resin induced by such heat generation remains below the melting point of the temporary material 17.

Other required characteristics of the material which forms the permanent outer member 14, is that it hardens in a manner which leaves both its interior and exterior surfaces transparently smooth, and also that it be chemically resistant to all liquids to be used as a circulating liquid in the liquid display. It should also be resistant to staining from both water-based and solvent-based coloring dyes which are likely to be included as ingredients for the circulating liquid.

Figure 6:
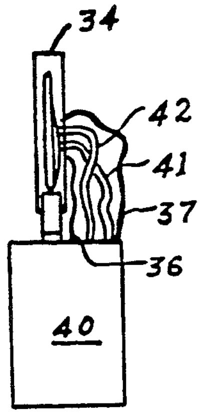
FIG. 6 is a side view of the sign of FIG. 5.
Figure 7:
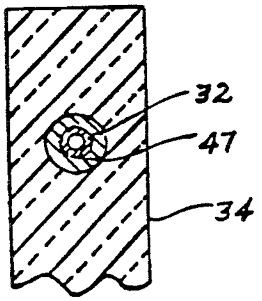
FIG. 7 is an enlarged fragmentary cross section view taken along the section line 7—7 in FIG. 5 showing the sign during a phase of construction.
Figure 8:
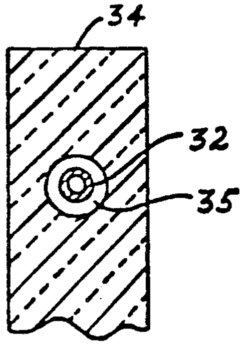
FIG. 8 is a view similar to FIG. 7 but after construction of the sign is completed.

In liquid display systems of the type disclosed in U.S. Pat. No. 2,029,183 and co-pending U.S. Pat. application, Ser. No. 07/663,152, now U.S. Pat. No. 5,075,992, the inner luminous tubing member is enclosed or overlapped by a liquid conduit which is also a tubing formed in sleeved concentric relation about the inner member. In another form of liquid display apparatus, the outer member can take the form of a transparent block of polyester resin or acrylic material as shown in the apparatus of FIG. 5 and FIG. 6. In this form of display apparatus, an inner luminous tubing member 32 of the sign 30 is configured in script form by conventional glass forming techniques and is encased in an outer rectangular block 34 of transparent material. The tubing member 32 is preferably an electric discharge tube, provided at its sealed ends with electrodes which are connected by electrical leads 36, 37 to an appropriate power supply (not shown) for energizing the tubing to a luminous conductive state. The inner tubing 32 is supported in the passage 35 formed in the block 34 in a script configuration similar to that of the tubing 32. The passage 35 is connected at one end to a liquid circulating system 40 by an entry conduit 41 and at its other end to the system 40 by an exit conduit 42.

To form the block 34 in encasing relation to the tubing 32, the tubing 32 is first coated externally with a temporary material 47, such as a water-gelatin compound, as by repeated dippings in a vat filled with the viscid water-gelatin compound in a manner similar to the forming of the temporary material 17 as previously described.

After a desired thickness of the temporary coating material 47 is attained, the tubing 32 with its coating of temporary material 47 is then lowered into a vat filled with a viscous semi-liquid polyester resin, which immediately prior thereto has been mixed with a chemical hardener, such as methyl ethyl ketone. Preferably, the tubing 32 with its temporary coating 47 are held suspended in the vat by means of the entry conduit 41 and exit conduit 42 for a period of time sufficient to allow the polyester resin to harden and form the solid block 34.

After removal of the sign and the block 34 from the vat, the temporary material 47 is removed from the block by heating to a temperature above its melting point but below the deflection temperature of the polyester resin whereby in liquid form it may be drained from the block. The evacuation of the temporary material 47 leaves the block 34 with a passage 35 formed therein which communicates with the entry and exit conduits 41 and 42 and is of a script configuration corresponding to that of the inner tubing 32 which is held suspended therein and encased by the block 34.

The transparent outer member has been disclosed in two embodiments herein as a transparent tubing 14 and also as a block 34 of transparent material which has been described to be of rectangular parallelepiped form but could have other geometric shapes. The inner tubing 12 is preferably lead glass, which is amenable to glass forming techniques such as bending when heated in a flame, but could also be made of other material so long a it is compatible with the liquid circulating system. The connector tees 16*a*, 16*b*, are preferably of a plastic material, such as high density polyethylene (HDPE), which facilitates bonding to the polyester resin, although non-corrosive metal connectors could be used. The entry and exit conduits are typically flexible conduits of any suitable material which is compatible with the circulating liquids including rigid metallic tubing.

It is important, however, that the material used as the temporary material 17 and 47 provides a coating with a very smooth surface exterior and that the outer member (14, 34) which is formed thereabout is also formed with a very smooth inner surface so as to avoid a roughened surface which scatters light and reduces transparency. The invention can also be extended to encasing and forming a passage about non-linear elongate luminous members in general. Further, while means other than the application of heat might be employed to remove the temporary substance from between the inner tubing and the outer members, such as by the use of acid, such techniques may, in some instances, etch the inner surface of the outer member, leaving it in a rough and unsatisfactory condition.

It is to be understood therefore that the foregoing description of the invention has been presented for purposes of illustration and explanation. Various alternative techniques and materials as are apparent, to those skilled in the art, could be used in performing the method steps of the invention without departing from the scope and spirit of the invention a defined in the appended claims.

What is claimed is:

1. A method of encasing a luminous tubular member of non-linear configuration and complex geometry in a transparent outer member so as to provide a passage of annular radial cross section therebetween, said method comprising the steps of:

coating the exterior of the luminous tubular member with a viscous temporary substance which solidifies to provide a coating of pre-determined thickness and smooth exterior surface, coating the temporary substance with a permanent material in a viscous liquid state which hardens to form a rigid permanent transparent outer member in coextensive surrounding relation to the luminous tubular member and its coating of temporary substance, applying heat to said coating of temporary substance at temperature above the melting point of the temporary substance and below the deflection temperature at which the outer member begins to soften; and removing the molten temporary substance from between the luminous tubular member and the transparent outer member while rigidly supporting the luminous tubular member in fixed relation to the outer member to thereby provide a passage defined by the annular space between the luminous tubular member and the transparent outer member.

2. The method as set forth in claim 1 wherein said luminous tubular member is an electric gas discharge tube formed by withdrawing air from the gas discharge tube and filling the tube with a gas which is rendered luminescent under a passage of electric current, applying electrodes to the ends of said gas discharge tube and sealing the ends of said gas discharge tube.

3. The method as set forth in claim 1 including the step of forming ports in said transparent outer member adjacent its ends whereby fluids may be circulated through said annulus.

4. The method as set forth in claim 1 wherein said permanent material is characterized by a deflection point temperature at which it begins to soften, said temporary substance has a melting point temperature which is less than said deflection point temperature, and wherein said temporary substance is removed by an application of heat to a temperature in a range between said melting point and deflection point temperatures to thereby provide the annulus between the luminous tubular member and said transparent outer member.

5. The method as set forth in claim 1 wherein said temporary substance is of gelatinous material.

6. The method as set forth in claim 1 wherein said permanent forming material is a polyester resin mixed with a chemical hardener.

7. The method as set forth in claim 1 wherein said temporary substance is removed by chemical action to form said annulus.

8. A method of encasing a translucent glass-like tubular member of non-linear configuration and complex geometry in a transparent outer member so as to provide a passage of annular radial cross section therebetween said method comprising the steps of:

coating of the exterior of the translucent tubing with a viscous temporary material, solidifying the viscous temporary material to provide a coating of predetermined thickness and smooth exterior surface of transparent quality, coating the temporary material with a permanent material in a viscous liquid state which hardens to form a rigid permanent transparent outer member in coextensive surrounding relation to the translucent tubing and its coating of temporary material, applying heat to said coating of temporary material at a temperature above the melting point of the temporary material and below the deflection temperature of the outer member, removing the molten temporary material from between the translucent tubing and the transparent outer member while rigidly supporting the translucent tubing in fixed relation to the outer member to thereby provide a passage defined by the annular space between the translucent tubing and the transparent outer member.

9. The method as set forth in claim 8 wherein said translucent tubular member is an electric gas discharge tube formed by withdrawing air from the gas discharge tube and filling the tube with a gas which is rendered luminescent under a passage of electric current, applying electrodes to the ends of said gas discharge tube and sealing the ends of said gas discharge tube.

10. The method as set forth in claim 8 including the step of forming ports in said transparent outer member adjacent its ends whereby fluids may be circulated through said passage.

11. The method as set forth in claim 8 wherein said permanent material is characterized by a deflection point temperature at which it begins to soften, said temporary material has a melting point temperature which is less than said deflection point temperature, and wherein said temporary material is removed by an application of heat in a temperature range between said melting point and deflection point temperatures to thereby provide the passage between the translucent tubular member and said transparent outer member.

12. The method as set forth in claim 8 wherein said temporary material is a water-gelatin material.

13. The method as set forth in claim 8 wherein said permanent forming material is a polyester resin mixed with a chemical hardener which chemically reacts with the polyester resin in a process which hardens the resin.

14. The method as set forth in claim 8 wherein said temporary material is a water-gelatin material characterized by a melting point temperature and a crystallizing temperature at which crystallization occurs and which in the step of coating the translucent tubular member is applied in the molten state and cooled thereon at an ambient temperature in the range between the melting point temperature and the crystallizing temperature of the temporary material.

15. The method as set forth in claim 14 wherein said permanent material is characterized by a deflection point temperature at which it begins to soften, said melting point temperature of the temporary material is less than the deflection point temperature of said outer member and wherein said temporary material is removed by an application of heat in a temperature range between said melting point and deflection point temperatures for converting the temporary material to the molten state and draining of the temporary material from between the translucent tubular member and the permanent outer member to form said passage.

16. A method of encasing an elongate luminous member of non-linear configuration and complex geometry in a transparent outer member in radially spaced relation thereto so as to provide a passage therebetween, said method comprising the steps of:

coating the exterior of the elongate luminous member with a viscous temporary substance which congeals to provide a coating of pre-determined thickness and smooth exterior surface, coating the temporary substance with a material in a viscous liquid state which hardens to form a rigid permanent transparent outer member in coextensive surrounding relation to the luminous member and its coating of temporary substance, applying heat to said coating of temporary substance at a temperature above the melting point of the temporary substance and below the deflection temperature at which the outer member begins to soften; and removing the molten temporary substance from between the elongate luminous member and the transparent outer member while rigidly supporting the elongate luminous member in fixed relation to the outer member to thereby provide a passage defined by the annular space between the elongate luminous member and the transparent outer member.

* * * * *